US007913310B2

(12) United States Patent
Peeters et al.

(10) Patent No.: US 7,913,310 B2
(45) Date of Patent: Mar. 22, 2011

(54) DEVICE FOR PROTECTING AGAINST UNAUTHORIZED USE OF SOFTWARE

(75) Inventors: Bernd Peeters, Geesthacht (DE); Wulf Harder, Geesthacht (DE)

(73) Assignee: SIA whiteCryption, Riga (LV)

( * ) Notice: Subject to any disclaimer, the term of this patent is extended or adjusted under 35 U.S.C. 154(b) by 495 days.

(21) Appl. No.: 10/507,880

(22) PCT Filed: Mar. 13, 2003

(86) PCT No.: PCT/EP03/02602

§ 371 (c)(1), (2), (4) Date: Oct. 21, 2004

(87) PCT Pub. No.: WO03/079164

PCT Pub. Date: Sep. 25, 2003

(65) Prior Publication Data

US 2005/0229259 A1 Oct. 13, 2005

(30) Foreign Application Priority Data

Mar. 18, 2002 (DE) .............................. 202 04 651 U

(51) Int. Cl.
*G06F 11/30* (2006.01)

(52) U.S. Cl. ............. 726/27; 726/24; 713/188; 713/193

(58) Field of Classification Search .................... 726/26, 726/27, 31–33, 24; 713/182, 193, 198, 188
See application file for complete search history.

(56) References Cited

U.S. PATENT DOCUMENTS 5,088,033 A * 2/1992 Binkley et al. .................. 703/24
5,854,891 A 12/1998 Postlewaite et al.
5,893,118 A 4/1999 Sonderegger
6,188,995 B1 2/2001 Garst et al.
6,198,941 B1 * 3/2001 Aho et al. .................. 455/552.1
6,229,894 B1 * 5/2001 Van Oorschot et al. ...... 713/150
6,564,178 B1 * 5/2003 Brummel ........................ 703/22
2003/0056096 A1 * 3/2003 Albert et al. .................. 713/168
2003/0115038 A1 * 6/2003 Want et al. ...................... 703/24
2003/0143973 A1 * 7/2003 Nagy et al. .................... 455/403

FOREIGN PATENT DOCUMENTS

EP 0740253 A2 4/1996
JP 01273135 * 5/2001
JP 2001273135 10/2001
WO 9016027 A1 12/1990
WO WO 00/31608 6/2000
WO WO0031608 * 6/2000

* cited by examiner

*Primary Examiner* — Emmanuel L Moise
*Assistant Examiner* — Paul Callahan
(74) *Attorney, Agent, or Firm* — Kinney & Lange, P.A.

(57) ABSTRACT

A device for protecting against unauthorized use of software, characterized in that a first processor emulates a second processor, whereby the second processor executes program code and the second processor transmits data to a computing system running the software in a process, whereby the process enters an error condition if the data contain errors.

12 Claims, 1 Drawing Sheet

Computing system (7)
Application (1)
Encrypted program code (4)
data exchange
Virtual processor (3)
emulates
executes
transmission
Processor (2)
Encrypted program code (4)
decodes
Decoded program code (4)

DEVICE FOR PROTECTING AGAINST UNAUTHORIZED USE OF SOFTWARE

CROSS-REFERENCE TO RELATED APPLICATION(S)

This application is the national stage of PCT Application No. PCT/EP03/02602 filed Mar. 13, 2003 for "Device for Protecting Against Unauthorized Use of Software" by Bernd Peeters and Wulf Harder, which in turn claims priority from German Application No. 202 04 651.6 filed Mar. 18, 2002.

BACKGROUND OF THE INVENTION

The invention refers to a device for protecting against the unauthorized use of software.

State-of-the-art: in the SAM copy protection system from Comprotec, encrypted, secret programs of a protected PC application are transmitted to a dongle connected to the PC. The dongle contains a device for decrypting and executing the program. During execution of the program, unencrypted data are exchanged with the protected application. The protected application only works properly if the data exchanged are without errors. This is only possible if the dongle is connected to the PC. The dongle is usually distributed together with the protected application. Since the dongle is very difficult or even impossible to reproduce without knowledge of the secret technical details and the programs run on the dongle are kept secret, unauthorized use of the application is prevented. The secret programs can also read and write to a persistent memory on the dongle. This enables, for example, license information to be transmitted to the dongle without this procedure being manipulated externally.

The disadvantage of this copy protection device consists thereof that the copy protection manufacturer cannot change the processor type on the dongle without requiring considerable changes to the protected applications and the secret program code. Moreover, the application provider is committed to using a dongle from a particular provider of copy protection. The use of dongles from other copy protection providers is generally not possible without changing the application if these use other types of processors. Another disadvantage is that the copy protection provider can only use processors that enable the program code to be read from RAM. Since the programs should be replaceable, reading from a ROM or EPROM is not an option. Using smart card controllers which meet high security standards is generally not possible, since these generally only run permanently stored program code. Furthermore, the creation of a standard for license transactions is not possible, if providers of copy protection use various processor types with diverse instruction sets.

BRIEF SUMMARY OF THE INVENTION

The present invention is based on the object of enabling the execution of secret, exchangeable program code for protection against unauthorized use of an application to run independent of the processor type and to enable the use of controllers with permanent program storage, particularly smart card controllers, for execution. In addition, the creation of a standard for license transactions should be supported.

BRIEF DESCRIPTION OF THE DRAWINGS

The sole FIGURE is a block diagram illustrating a device for protecting against the unauthorized use of software according to an embodiment of the present invention.

DETAILED DESCRIPTION

Figure 1:
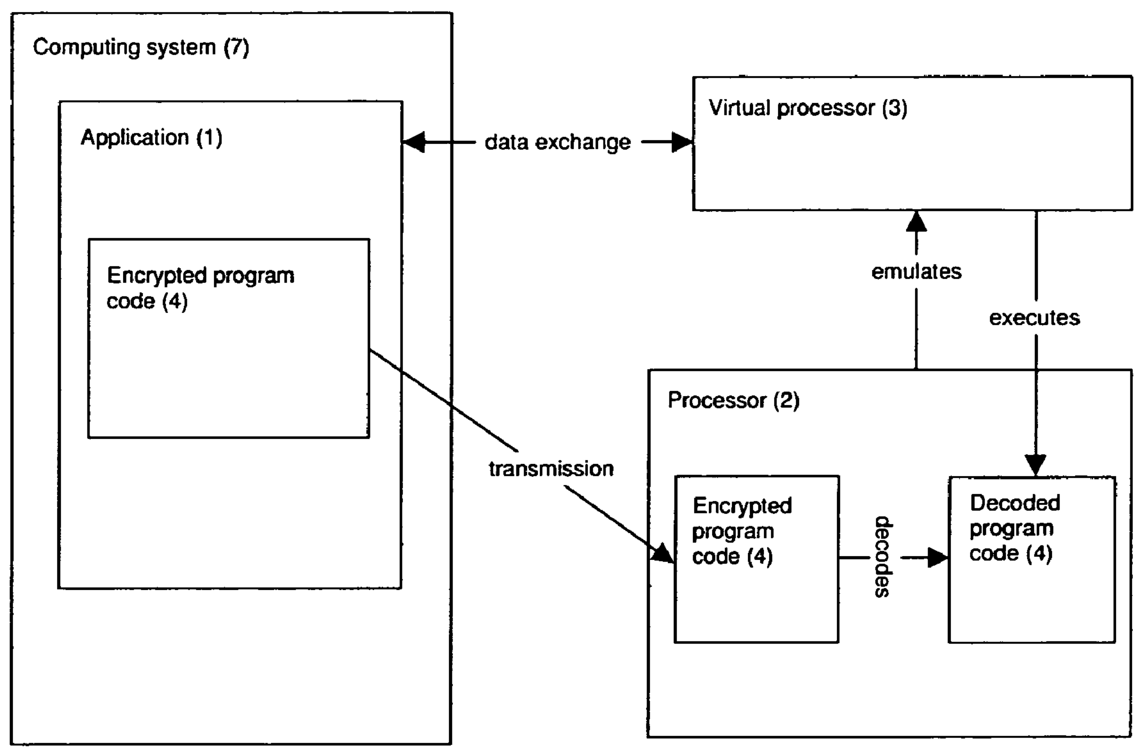

The object is solved as follows. A first processor 2 emulates a possibly virtual second processor 3. The architecture and instruction set of the second processor 3 can be published. A provider of copy protection can implement the instruction set in an instruction interpreter on the processor type of his choice. A protected application is independent of the implementation of this instruction interpreter and of the specific properties of the first processor 2. The copy protection devices of various manufacturers are compatible with one another. A protected application can work in conjunction with the copy protection devices of various manufacturers. This consequence is particularly important if the copy protection device is to be built into mobile telephones. A further consequence is that a provider of copy protection can change the first processor 2 any time, if for example it is no longer available, without the provider of an application having to change the application.

The choice of a smart card controller is also possible; it is even possible to let a processor of the computer system 7, such as the processor of the PC hosting the application or a security controller installed on the PC motherboard, emulate the second processor 3. In one embodiment, the secret program codes 4 are transmitted in encrypted form to the first 2 or second processor 3, decrypted and executed. This can happen in one step or several partial steps. Preferably, the secret program codes 4 will be transmitted from the computing system 7 to the first 2 or second processor 3. In order to keep the memory requirement for emulation low, it can be a good idea to perform the transmission in several partial steps. After each partial step, the first processor 2 informs the computing system which program code 4 should be sent next, which depends on the status of the second processor 3, in general of the new calculated program counter. Virtual program storage is achieved this way. A virtual data store for the second processor 3 can also be implemented this way.

In a further embodiment of the invention, the encryption and decryption are carried out in two steps. During encryption, the program code 4 is encrypted with a symmetric encryption key 8. The key 8 is then encrypted with a public key 9 and transmitted together with the program code 4 to the first 2 or second processor 3. This one then decodes the key 8 with an appropriate private key 10. Then the key 8 is used to decode the program code 4. This procedure enables an application developer to choose the processors or processor types for executing the program code 4. If, for example, a processor type appears not secure to the application developer, so that it is feared the secret program code 4 may become known, then the application developer encrypts the program code 4 with public keys 9 from processor types that appear secure rather than with the public key 9 assigned to this processor type.

The second processor 3 could, read and write license information in a persistent memory for example. If the instruction set of the second processor 3 receives cryptographic instructions, secondary processors 3 can exchange the encrypted data among themselves or for example a second processor 3 can emulate other data generators that execute cryptographic functions.

The use of public key procedures are available for the transfer of license information from one processor to another processor 3. This generally enables encryption and authentication of transferred data between secondary processors 3.

Another option for emulating a second processor 3 beside a dongle connected to a PC is the use of wireless, preferably handheld devices, such as mobile telephones, pocket computers, etc. This option makes it easier for the user of the protected application to handle the copy protection. For example, the user need only have his mobile telephone with him and can then also use a protected, but licensed application even at other locations without manual intervention. Furthermore, the user can use an Internet connection or dial a particular telephone number to transfer a software license to his mobile telephone. In the latter case, the license value could be billed via the telephone invoice. In addition with mobile telephones there is the option to use the security controller that is usually present to emulate the second processor 3.

The invention will be described below using an example referring to FIG. 1. A dongle connected to a computing system 7 contains a first processor 2 with an instruction set containing an instruction for decoding. In addition, the first processor 2 contains a working register and RAM and is externally protected against reading and manipulation of the contents of memory. A program stored in a ROM of the first processor 2 emulates a second processor 3, which also contains a working register and RAM. This RAM and this working register are saved in the RAM of the first processor 2 during this process. The instructions of the second processor 3 are implemented using an interpreter that is also stored in the ROM of the first processor 2, which recognizes the instruction operating codes of programs intended for the second processor 3 and triggers certain actions for each recognized instruction, such as changing the register contents of the second processor 3 or sending and/or receiving data from the computing system 7. An application 1 will be started on the computing system. The application 1 transmits an encrypted program code 4 to the first processor 2. The first processor 2 decodes the program code 4 using its decoding instruction. Now the interpretation of the decoded program code begins on the first processor 2, which is equivalent to emulation of a second processor 3. The program code 4 contains instructions with which data sent by the computing system 7 are received. These data are processed using the interpreted program code 4, and the results needed by the active application 1 are sent to the computing system 7. If the results are not received or mistakes are found in the results, the process executing the application 1 goes to an error condition, in which for example the application 1 deviates from its intended behavior. As a result, the proper utilization of the application 1 is prevented and the application 1 is thereby protected against unauthorized use.

The invention claimed is:

1. A device for protecting against unauthorized use of software, comprising:

a computing system running the software in a process, wherein running the software requires transmission of predetermined program code to a predetermined second processor, execution of the predetermined program code by the second processor, and communication of data between the second processor and the computing system to ensure only authorized use of the software; and a first processor emulating the second processor, wherein the first processor is operable to receive the predetermined program code from the computing system, to interpret and execute the predetermined program code according to protocols of the second processor, and to transmit data to the computing system processed using the predetermined program code;

whereby the process of running the software enters an error condition if the data transmitted to the computing system is not received or contains errors, without affecting the emulation of the second processor by the first processor, the error condition preventing proper utilization of the software.

2. The device according to claim 1, wherein the first processor is a microcontroller, a smart card controller or a processor of the computing system.

3. The device according to claim 1, wherein the first processor is operable to receive the predetermined program code in encrypted form and to decrypt it.

4. The device according to claim 3, wherein the first processor is further operable to receive a symmetric key being encrypted with a public key, the predetermined program code having been encrypted with the symmetric key, so that subsequently the symmetric key is decryptable with a private key associated with the public key allowing the predetermined program code to be decrypted with the symmetric key.

5. The device according to claim 1, wherein the protocols of the second processor include an instruction set that contains instructions that can read from and/or write to a persistent memory.

6. The device according to claim 1, wherein the protocols of the second processor include an instruction set that contains cryptographic instructions.

7. The device according to claim 6, wherein the instruction set contains instructions for executing public key encryption processes.

8. The device according to claim 1, wherein the first processor is located in a portable, wireless device.

9. The device according to claim 8, wherein the portable, wireless device is a mobile telephone, a personal digital assistant (PDA), a handheld computer or a combination thereof.

10. The device according to claim 9, wherein the device receives software license information by means of a telephone connection, and this information is able to be queried by the predetermined program code.

11. The device according to claim 1, wherein the first processor communicates license information via an Internet connection.

12. The device according to claim 1, wherein the first processor is located in a dongle communicatively connected to the computing system.

* * * * *